(12) United States Patent
Hall

(10) Patent No.: US 6,421,357 B1
(45) Date of Patent: Jul. 16, 2002

(54) HIGH-PENETRATION RADIOCOMMUNICATION SYSTEM USING A COMPACT CHARACTER SET

(75) Inventor: David Charles Hall, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/103,428

(22) Filed: Jun. 24, 1998

(51) Int. Cl.⁷ .............................................. H04T 13/00
(52) U.S. Cl. ............................ 370/479; 341/60; 341/90
(58) Field of Search ............................... 370/342, 441, 370/479, 317, 318, 335; 340/825.59, 825.69, 825.44, 825.47, 458; 455/426, 31.1, 10; 341/50, 60, 90, 91, 92; 375/262, 265, 295, 316, 340

(56) References Cited

U.S. PATENT DOCUMENTS

| 4,145,573 A | 3/1979 | Arnold | 179/15 |
| 4,301,533 A | 11/1981 | Acampora et al. | 370/104 |

(List continued on next page.)

FOREIGN PATENT DOCUMENTS

| AU | A30188/92 | 6/1994 | |
| EP | 0535812 | 9/1992 | H03M/13/00 |
| EP | 0565507 | 4/1993 | H04B/7/005 |
| WO | WO81/00034 | 1/1981 | H04J/3/16 |
| WO | WO94/13113 | 6/1994 | H04Q/7/04 |
| WO | WO95/12931 | 5/1995 | H04J/3/00 |
| WO | WO95/31878 | 11/1995 | H04Q/7/22 |
| WO | WO96/04718 | 2/1996 | H04B/7/005 |
| WO | WO 97/18650 | 5/1997 | |

OTHER PUBLICATIONS

Vojcic et al., "Power Control Versus Capacity of a CDMA System Operating Over a Low Earth Orbiting Satellite Link", GLOBECOM '93, vol. 4, pp. 40–44.

(List continued on next page.)

*Primary Examiner*—Ricky Ngo
*Assistant Examiner*—Phuc Tran
(74) *Attorney, Agent, or Firm*—Coats & Bennett, P.L.L.C.

(57) ABSTRACT

A high-penetration transmission method uses a compact character set for encoding an alphanumeric message, in which the signal margin is increased by a combination of bit repetition and a relatively small increase in power. The combination of bit repetition and a relatively small increase in power with a encoding via a compact character set avoids unacceptable delay characteristics. Moreover, the combination of repetition and a relatively small increase in power with the compact character set of the present invention avoids the co-channel interference problems of systems which rely solely on a power increase to increase the signal margin, as less power increase is required to obtain the same increase in signal margin for a given delay time. In one embodiment, a mobile radiocommunication system is provided with a short message service feature for transmitting alphanumeric messages to and from a mobile unit. In order to ensure reliable transmission over channels having severe attenuation, the communication system, a short message is encoded with a compact character set. The message may be further encoded with error detection or correction coding; the message is divided into packets or groups of one or more bits each; each packet is transmitted, at a power level greater than the power level for voice transmission, multiple times over a TDMA communication channel, using the same time slot or slots for each transmission. The transmissions are integrated and checked for errors at the receiver to form a signal having an increased margin.

24 Claims, 4 Drawing Sheets

U.S. PATENT DOCUMENTS

| | | | |
|---|---|---|---|
| 4,309,764 A | | 1/1982 | Acampora .................... 370/83 |
| 4,383,257 A | * | 5/1983 | Giallanza et al. ...... 340/825.47 |
| 4,495,619 A | * | 1/1985 | Acampora .................. 370/104 |
| 4,658,436 A | | 4/1987 | Hill ............................. 380/31 |
| 4,679,227 A | | 7/1987 | Hughes-Hartogs ........... 379/98 |
| 4,691,314 A | | 9/1987 | Bergins et al. ............... 370/94 |
| 4,731,866 A | | 3/1988 | Muratani et al. .............. 455/9 |
| 4,882,765 A | | 11/1989 | Maxwell et al. ............. 455/18 |
| 4,905,235 A | | 2/1990 | Saburi ...................... 370/95.3 |
| 4,910,792 A | | 3/1990 | Takahata et al. ............. 455/10 |
| 4,914,651 A | | 4/1990 | Lusignan .................. 370/69.1 |
| 4,941,144 A | | 7/1990 | Mizukami .................. 371/5.5 |
| 5,396,228 A | * | 3/1995 | Garahi ................. 340/825.44 |
| 5,406,593 A | | 4/1995 | Chennakeshu et al. ..... 375/120 |
| 5,450,395 A | | 9/1995 | Hostetter et al. ............. 370/18 |
| 5,487,185 A | | 1/1996 | Halonen .................... 455/127 |
| 5,563,606 A | | 10/1996 | Wang ........................ 342/354 |
| 5,648,967 A | | 7/1997 | Schulz ....................... 370/328 |
| 5,765,114 A | * | 6/1998 | Fukuda ...................... 455/574 |
| 5,822,310 A | * | 10/1998 | Chennakeshu et al. ..... 370/317 |
| 5,978,654 A | * | 11/1999 | Colwell et al. ............ 455/31.1 |
| 6,046,990 A | * | 4/2000 | Chennakeshu et al. ..... 370/317 |
| 6,112,083 A | * | 8/2000 | Sweet et al. ................ 455/426 |
| 6,141,535 A | * | 10/2000 | Ayerst ....................... 455/31.1 |

OTHER PUBLICATIONS

Del Re et al., "The GSM Procedures in an Integrated Cellular/Satellite System", IEEE J. Sel. Areas Comm., Feb. 1995, vol. 13, pp. 421–430.

M. Luglio, "Fade Countermeasures in Ka Band: Application of Frequency Diversity to a Satellite System", Tenth Int'l Conf. on Digital Satellite Communications, vol. 1, pp. 143–151 1994.

Redl et al., An Introduction to GSM, pp. 86–99, Artech House, 1995.

* cited by examiner

HIGH-PENETRATION RADIOCOMMUNICATION SYSTEM USING A COMPACT CHARACTER SET

BACKGROUND OF THE INVENTION

The present invention generally relates to radiocommunication systems and more particularly relates to a system and method for reliably transmitting radiocommunication signals under non-ideal conditions. Referring to FIG. 1, a typical cellular mobile radiocommunication system is shown. The typical system includes a number of base stations similar to base station 110 and a number of mobile units or stations similar to mobile 120.

Voice and/or data communication can be performed using these devices or their equivalents.

The base station includes a control and processing unit 130 which is connected to the MSC (mobile switching center) 140 which in turn is connected to the public switched telephone network (not shown).

The base station 110 serves a cell and includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver broadcasts the traffic or voice channels which can include digital control channel location information.

When the mobile 120 first enters an idle mode, it periodically scans the control channels of base stations like base station 110 for the presence of a paging burst addressed to the mobile 120. The paging burst informs mobile 120 which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in U.S. Pat. No. 5,745,523 entitled "Multi-Mode Signal Processing." It will be appreciated that the base station may be replaced by one or more satellites in a satellite-based mobile radiocommunication system.

To increase radiocommunication system capacity, digital communication and multiple access techniques such as Frequency Division Multiple Access (FDMA), Time Division Multiple Access (TDMA), and Code Division Multiple Access (CDMA) may be used. The objective of each of these multiple access techniques is to combine signals from different sources onto a common transmission medium in such a way that, at their destinations, the different channels can be separated without mutual interference. In a FDMA system, users share the radio spectrum in the frequency domain. Each user is allocated a part of the frequency band which is used throughout a conversation. In a TDMA system, users share the radio spectrum in the time domain. Each radio channel or carrier frequency is divided into a series of time slots, and individual users are allocated a time slot during which the user has access to the entire frequency band allocated for the system (wideband TDMA) or only a part of the band (narrowband TDMA). Each time slot contains a "burst" of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. In a CDMA system, each user is assigned a unique pseudorandom user code with which the user's information signal is modulated to distinguish it from other user's signals.

In a TDMA system, the successive time slots assigned to the same user, which are usually not consecutive time slots on the radio carrier, constitute the user's digital traffic channel, which is considered to be a logical channel assigned to the user. The organization of TDMA channels, using the GSM standard as an example, is shown in FIG. 2. The TDMA channels include traffic channels TCH and signaling channels SC. The TCH channels include full-rate and half-rate channels for transmitting voice and/or data signals. The signaling channels SC transfer signaling information between the mobile unit and the satellite (or base station). The signaling channels SC include three types of control channels: broadcast control channel (BCCHs), common control channels (CCCHs) shared between multiple subscribers, and dedicated control channels (DCCHs) assigned to a single subscriber. A BCCH typically includes a frequency correction channel (FCH) and a synchronization channel (SCH), both of which are downlink channels. The common control channels (CCCHs) include downlink paging (PCH) and access grant (AGCH) channels, as well as the uplink random access channel (RACH). The dedicated control channels DCCH include a fast associated control channel (FACCH), a slow associated control channel (SACCH), and a standalone dedicated control channel (SDCCH). The slow associated control channel is assigned to a traffic (voice or data) channel or to a standalone dedicated control channel (SDCCH). The SACCH channel provides power and frame adjustment and control information to the mobile unit. The random access channel RACH is used by the mobiles to request access to the system. The RACH logical channel is a unidirectional uplink channel (from the mobile to the base station or satellite), and is shared by separate mobile units (one RACH per cell is sufficient in typical systems, even during periods of heavy use). Mobile units continuously monitor the status of the RACH channel to determine if the channel is busy or idle. If the RACH channel is idle, a mobile unit desiring access sends its mobile identification number, along with the desired telephone number, on the RACH to the base station or satellite. The MSC receives this information from the base station or satellite and assigns an idle voice channel to the mobile station, and transmits the channel identification to the mobile through the base station or satellite so that the mobile station can tune itself to the new channel. All time slots on the RACH uplink channel are used for mobile access requests, either on a contention basis or on a reserved basis. Reserved-basis access is described in U.S. Pat. No. 5,420,864, entitled "Method of Effecting Random Access in a Mobile Radio System."

Transmission of signals in a TDMA system occurs in a buffer-and-burst, or discontinuous-transmission, mode: each mobile unit transmits or receives only during its assigned time slots in the TDMA frames on the mobile unit's assigned frequency. At full rate, for example, a mobile station might transmit during slot 1, receive during slot 2, idle during slot 3, transmit during slot 4, receive during slot 5, and idle during slot 6, and then repeat the cycle during succeeding TDMA frames. The transceiver of the mobile unit can be switched off (or "sleep") to save power during the time slots when it is neither transmitting nor receiving.

To increase mobility and portability, radiocommunication subscribers tend to prefer mobile units having a relatively small, omnidirectional (and accordingly, less powerful) antennas over mobile units having a large or directional antenna. Because of this preference, it is sometimes difficult to provide sufficient signal strength for the exchange of communication signals between typical mobile units having a small, omnidirectional antenna and a mobile switching center (MSC) or satellite. This problem is particularly serious in satellite-based mobile radiocommunications. A satellite-based mobile radiocommunication system provides radiocommunication services to particular geographical areas of the earth using one or more partially overlapping satellite beams. Each satellite beam has a radius of up to about 1000 km. Due to the power limitations of a satellite, it is not practical to provide a high link margin in every beam simultaneously. Because mobile satellite links are severely power limited, communication is typically limited to line-of-sight channels with Rician fading. Rician fading occurs from a combination of a strong line-of-sight path and a ground-reflected wave, along with weak building-reflected waves.

Rician channels require a communications link margin of approximately 8 dB or so to achieve voice communication in ideal or near-ideal conditions, such as when the mobile radiotelephone unit antenna is properly deployed and the unit is in an unobstructed location. The term "link margin" or "signal margin" refers to the additional power required to offer adequate service over and above the power required under ideal conditions, that is, a channel having no impairments other than additive white Gaussian noise (AWGN). "Impairments" may include fading of signal amplitude, Doppler shifts, phase variations, signal shadowing or blockage, implementation losses, and anomalies in the antenna radiation pattern. Whether transmitting voice or data, it is frequently desirable to increase the signal margin to ensure reliable radiocommunication performance, particularly in power-limited satellite applications.

In these near-ideal channels, the mobile unit can successfully monitor the paging channel to detect incoming calls. In non-ideal conditions, such as when the mobile unit antenna is not deployed or the mobile unit is in an obstructed location (e.g., inside a building) reflected waves, including ground-reflected and building-reflected waves, become dominant. The channels in these non-ideal conditions are characterized by flat Rayleigh fading (the most severe type of fading) with severe attenuation. In such channels, a link margin of as much as 30 dB or more is required to achieve voice communication, and the mobile unit may have difficulty monitoring the paging channel to detect incoming calls. In these non-ideal conditions where voice communication is made difficult, it is desirable to employ a short message service (SMS) is desirable to communicate information to the user. Due to the power limitations of the satellite, SMS is particularly effective when used in non-ideal conditions to alert a mobile station user of an incoming call. The mobile station user may then change locations to receive or return the call.

Known methods of increasing the link margin of a signal require increased transmit power levels or substantial transmission delay, or both. Such requirements are highly undesirable.

SUMMARY

Accordingly, it would be desirable for a radiocommunication system to allow for transmission of signals at an increased signal margin with a reduced significant delay but without a significant increase in power.

It would also be desirable for a TDMA communication system to allow for transmission of signals with an increased signal margin without requiring a change in the structure or organization of TDMA frames.

It would be further desirable for a mobile radiocommunication system to allow for transmission of data messages originating from either a mobile unit or from a satellite or base station with an increased signal margin.

It would be further desirable for a communication system to selectively increase the signal margin of a communication link for the transmission of data messages.

The above-noted and other limitations of conventional communication systems and methods are overcome by the present invention, which provides for a high-penetration transmission method in which an alphanumeric message is encoded using a compact character set, and in which the signal margin is increased by a combination of bit repetition and a relatively small increase in power. According to exemplary embodiments, the combination of bit repetition and a relatively small increase in power with encoding via a compact character set as described herein avoids the unacceptable delays characteristic of systems which rely solely on repetition to increase the signal margin, as less bits are required to encode a message. Likewise, the combination of repetition and a relatively small increase in power with the compact character set of the present invention avoids the co-channel interference problems of systems which rely solely on a power increase to increase the signal margin as less power increase is required to obtain the same increase in signal margin for a given delay time.

According to an exemplary embodiment of the present invention, a mobile radiocommunication system is provided with a short message service feature for transmitting alphanumeric messages to and from a mobile unit. In order to ensure reliable transmission over channels having severe attenuation, the communication system, a short message is encoded using a novel compact character set. The message may be further encoded with error detection or correction coding; the message is divided into packets or groups of one or more bits each; each packet is transmitted, at a power level greater than the power level for voice transmission, multiple times over a TDMA communication channel, using the same time slot or slots for each transmission; and the transmissions are integrated and checked for errors at the receiver to form a signal having an increased margin.

BRIEF DESCRIPTION OF THE DRAWINGS

The foregoing objects, features and advantages of the present invention will be more readily understood upon reading the following detailed description in conjunction with the drawings in which.

DETAILED DESCRIPTION OF THE PREFERRED EMBODIMENTS

While the following description is directed toward a short message service implemented in a satellite-based radiocommunication system, it will be appreciated that the present invention may also be applied to other types of communication systems.

Figure 1:
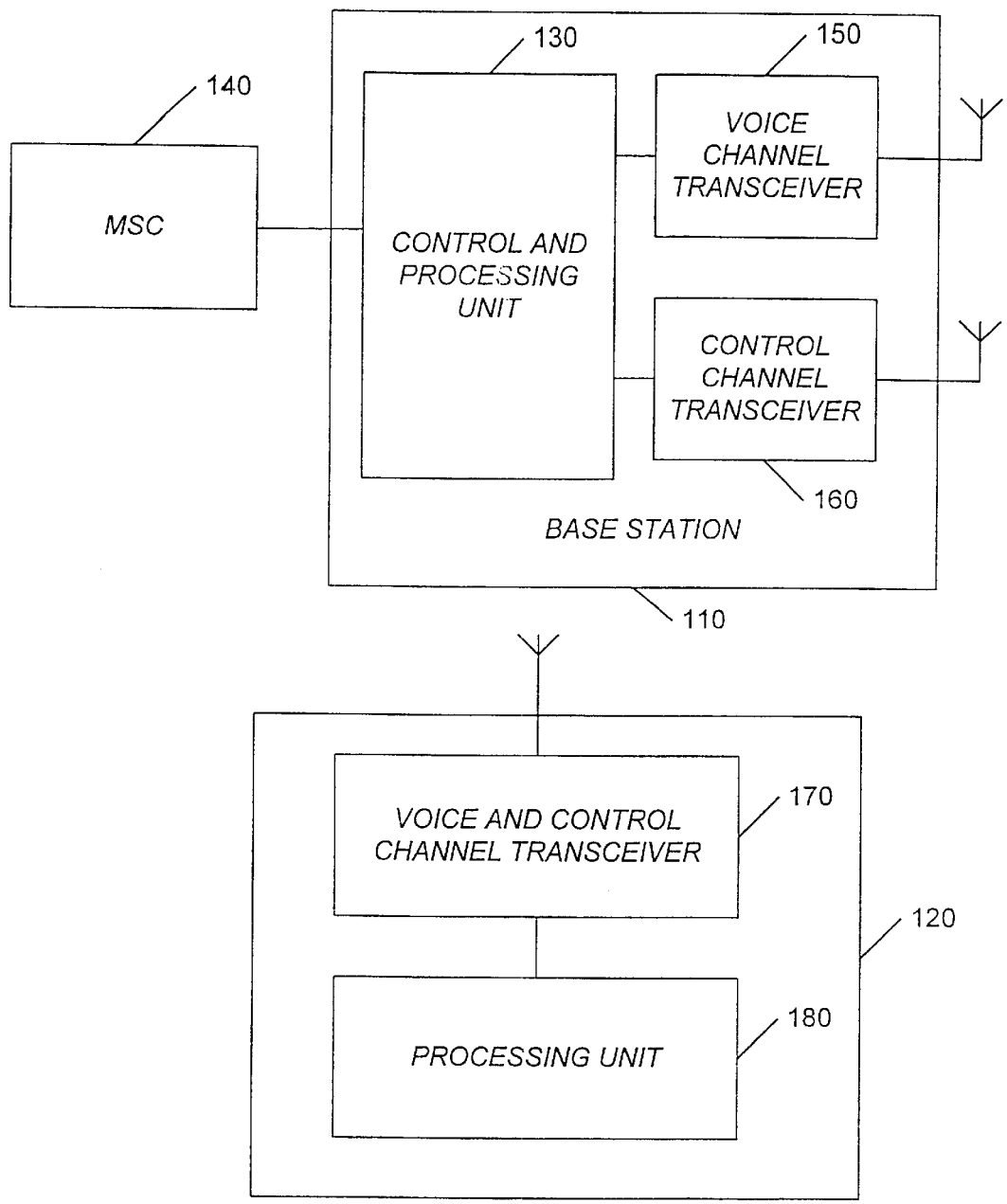
FIG. 1 is a block diagram of an exemplary mobile radiocommunication system.
Figure 2:
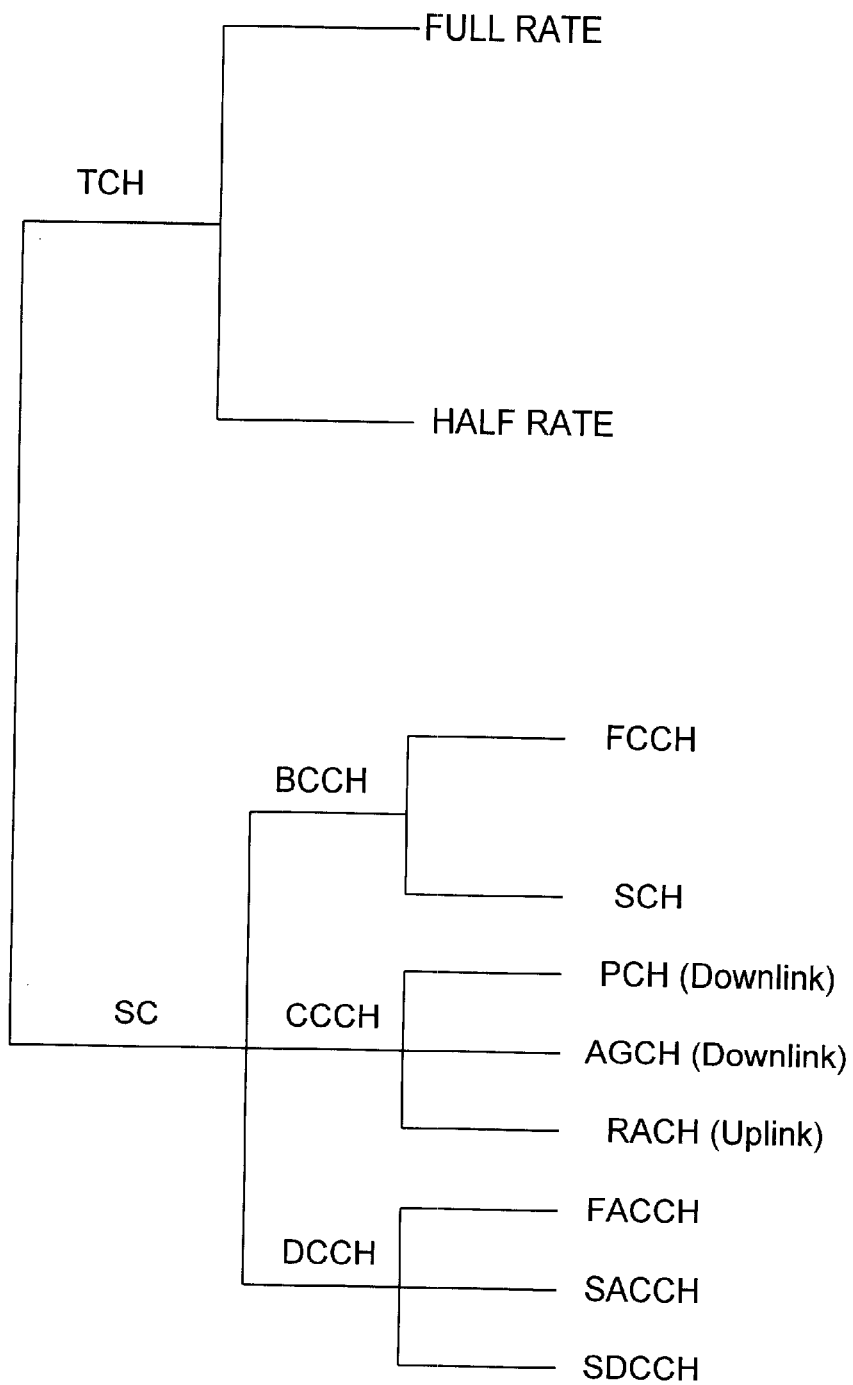
FIG. 2 is a diagram showing the organization of channels in a typical GSM digital radiocommunication system.
Figure 3:
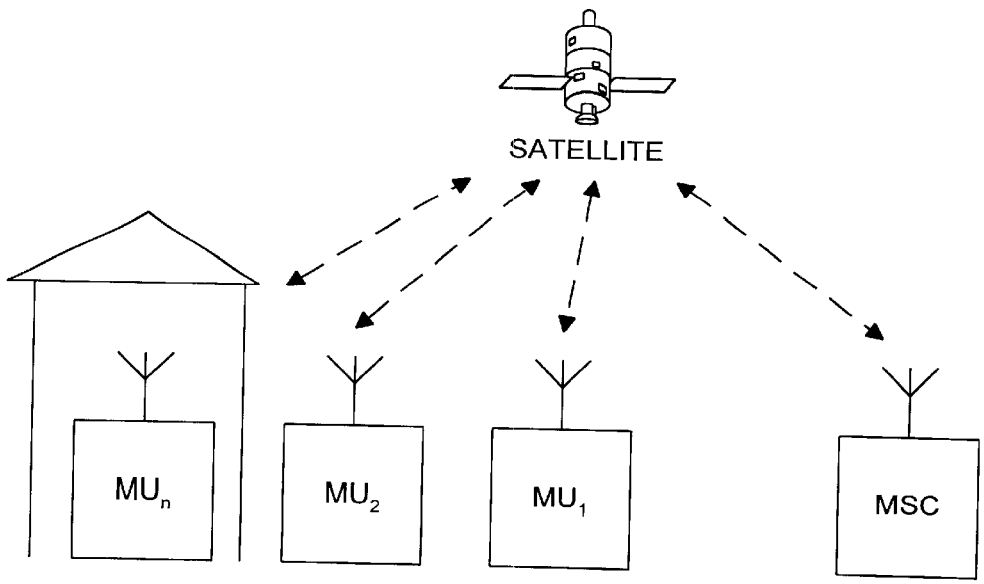
FIG. 3 is a diagram of a satellite-based mobile radiocommunication system in 30 which the signal transmission method of the present invention may be implemented.

In a satellite-based mobile radiocommunication system, a communication link for transmitting voice or data may be established between a mobile station and either a standard telephone or a second mobile station through one satellite, multiple satellites, or a combination of one or more satellites and the PSTN (public switched telephone network). Such a system, as shown in FIG. 3, may be desirable to achieve a broad geographical coverage in which few or no base stations are present, and additional base stations are not practical, such as in rural areas. Due to the inherent power limitations of satellites, voice communications links between the satellite and the mobile station require ideal or near-ideal conditions; that is, conditions such as line-of-sight communication with the mobile station's antenna properly deployed. In non-ideal conditions, such as when the mobile station is shadowed (e.g., inside a building, etc.) or when the mobile antenna is not properly deployed, the power or signal margin requirements for communication increases significantly due to the increased attenuation in the channel. In such situations (shown as MUn in FIG. 3), Rayleigh fading often prevents satisfactory communication, and it is therefore desirable to send a short alphanumeric message to the mobile station. The message may be used, for example, to inform the subscriber of an incoming call. The present invention ensures reliable transmission of the message by providing for an efficient technique for increasing signal margin without significant delay, power increase, or co-channel interference.

For purposes of illustration only, and without limiting the scope of the invention, a satellite-based GSM radiocommunication system using TDMA channels may be assumed to exhibit the following conditions. The communication channel has no line of sight component and is subject to flat Rayleigh fading with severe attenuation. As will be appreciated by those of skill in the art, Rayleigh (or multipath) fading is a phenomenon which occurs when multipath radio waves form standing-wave pairs due to reflection from the physical structures in a service area. The standing-wave pairs summed together form an irregular wave fading structure. When the mobile unit is stationary, it receives a constant signal. However, when the mobile unit is moving, the fading structure causes fading to occur which increases as the mobile unit moves faster. The mean signal level of the non-ideal Rayleigh channel is typically approximately 20–30 dB below the signal level of a near-ideal line-of-sight channel.

In order to ensure reliable transmission of a short message to the mobile unit in non-ideal conditions, the signal margin must be increased. According to the present invention, bit repetition and power increase may be combined with encoding using a compact character set to provide an increased signal margin without significant delay. The combination of bit repetition with small increase in power is described in U.S. patent application Ser. No. 08/559,692 entitled "High Penetration Transmission Method for Radiocommunication Systems" filed on Nov. 5, 1995 by Chennakeshu, et al. and assigned to the assignee of the present invention, which is incorporated herein by reference in its entirety.

It will be appreciated that decibels (dB) are units used to express ratios of power, current, or voltage. Specifically, a power ratio (P2/P1) may be expressed in decibels by the formula dB 10 log (P2/P1). A signal margin of 30 dB requires a power ratio of 1000, since 10 log 1000=30 dB. Increasing transmit signal power may be used to provide a higher link margin. Due to the power limitations of the satellite, this is typically not a practical approach. In addition to increasing the cost of the system, increased transmission power also makes it more difficult to control co-channel interference, particularly in TDMA systems with narrow re-use margins. Accordingly, large power increases from the satellite to the mobile unit may be provided only during periods of relatively light use. Further, because the mobile unit is even more power limited than the satellite, this technique is typically practical only in one direction, from the satellite to the mobile unit.

Bit repetition may also be used to increase the margin. Bit repetition may be accomplished with a lower error rate than message repetition, particularly in non-ideal conditions. Bit repetition causes transmission delay, which is not desirable for voice signals, for obvious reasons. However, transmission delay may be acceptable for data communications, such as a SMS feature, provided that the delay is kept to a reasonable minimum. Bit repetition is achieved by transmitting individual bits or modulation symbols, or packets of bits or modulation symbols, a plurality of times such that all repetitions are contained within the same time slot or slots of successive TDMA frames. The receiver integrates the energy from each repetition to create a signal having a higher margin. As noted above, bit repetition can cause significant delay, depending upon the length of the message. To achieve a 30 dB signal margin, each bit will have to be repeated 1000 times, since 10 log 1000=30 dB. A typical short message has between 32 and 64 characters in the GSM system, the European digital standard, up to 245 characters in the DAMPS (Digital Advanced Mobile Phone Service) system currently used in the United States, and up to 160 characters in the DECT (Digital European Cordless Telephone) system. Assuming a GSM system having TDMA frames of 18.64 ms, with 16 slots per frame and 114 data bits/slot, the minimum delay for receiving a 64 character message, not including propagation time, is as follows: 64 bits×8 bits/character×1000 repetitions/bit×18.64 ms/slot×1/114 slot/data bit=84 seconds.

However, to achieve a 15 dB margin, the required power ratio is only 31.623, since 10 log 31.623=15 dB. Thus, a 30 dB signal margin may be provided by increasing the power by 15 dB and repeating each bit approximately 31 times. Using this technique, the bit-repetition delay for a 64 character message is (64 characters×8 bits/character×31 repeats/bit×18.64 ms/slot×1/114 slot/bits) or approximately 2.5 seconds. As a result, the bit repetition delay is maintained at a reasonable level, and the power increase is also maintained at a reasonable level, thereby avoiding co-channel interference. It will be appreciated that many different combinations of repetitions and power increases are possible to achieve successful communication in Rayleigh fading environments without significant delay. Further, rather than repeating individual bits of a digital signal, groups of bits may be repeated.

It is observed that the messages transmitted in the system are SMS messages which are alphanumeric messages intended to be received by an end user. The present invention reduces the number of bits required to code a given message. This permits each bit to be repeated an increased number of times for a given delay factor, resulting in additional bit repetition margin. Alternately, for a given bit repetition, the present invention decreases the transmission time for the message.

According to the present invention, messages are encoded for transmission using the following character set which uses 5 bits per character instead of the typical 8 bits per character, (for a total of 32 available characters):

TABLE 1

Compact Character Set

| x0 | 00000 | <space> | x10 | 10000 | P |
|----|-------|---------|-----|-------|---|
| x1 | 00001 | A | X11 | 10001 | Q |
| x2 | 00010 | B,8 | x12 | 10010 | R |
| x3 | 00011 | C | x13 | 10011 | S,5 |
| x4 | 00100 | D | x14 | 10100 | T |
| x5 | 00101 | E | x15 | 10101 | U |
| x6 | 00110 | F | x16 | 10110 | V |
| x7 | 00111 | G,6 | x17 | 10111 | W |
| x8 | 01000 | H | x18 | 11000 | X |
| x9 | 01001 | I,1 | x19 | 11001 | Y |
| xA | 01010 | J | xlA | 11010 | Z |
| xB | 01011 | K | xlB | 11011 | 2 |
| xC | 01100 | L | xIC | 11100 | 3 |
| xD | 01101 | M | xlD | 11I01 | 4 |
| xE | 01110 | N | xlE | 11110 | 7 |
| xF | 01111 | O,0 | xlF | 11111 | 9 |

The five bit binary codewords 00000 through 11111 are referred to in this specification by their hexadecimal equivalent for convenience. Using this character set, the codewords x2, x7, x9, xF and x13 serve a dual purpose, identifying both an alphabetic character and a number. For example, codeword x9 would be sent for both 'I' and '1' causing the mobile to display the characters '|', Similarly, the codeword x2 encodes both 'B' and '8', the codeword x7 encodes both 'G' and '6', the codword xF encodes both 'O' and '0', and the codeword x13 encodes both 'S' and '5'. In this manner, the character set described in Table 1 can encode all 26 alphabetic characters, the numerals 0–9 and a space, making it possible to encode any short message desired to be sent to the user (albeit without punctuation).

The potential ambiguities caused by the use of a single codeword for both alphabetic and numeric characters may not be a problem since the messages are by definition alphanumeric messages intended to be received and interpreted by an end user. In any event, the paired alphabetic characters and numerals would be displayed the same on a 7-segment display. Even if the mobile does not have a 7-segment display, most 7-segment displays can be easily programmed by those having ordinary skill in the art to emulate a 7-segment LCD display whenever a high penetration SMS message is received as provided herein.

Figure 5:
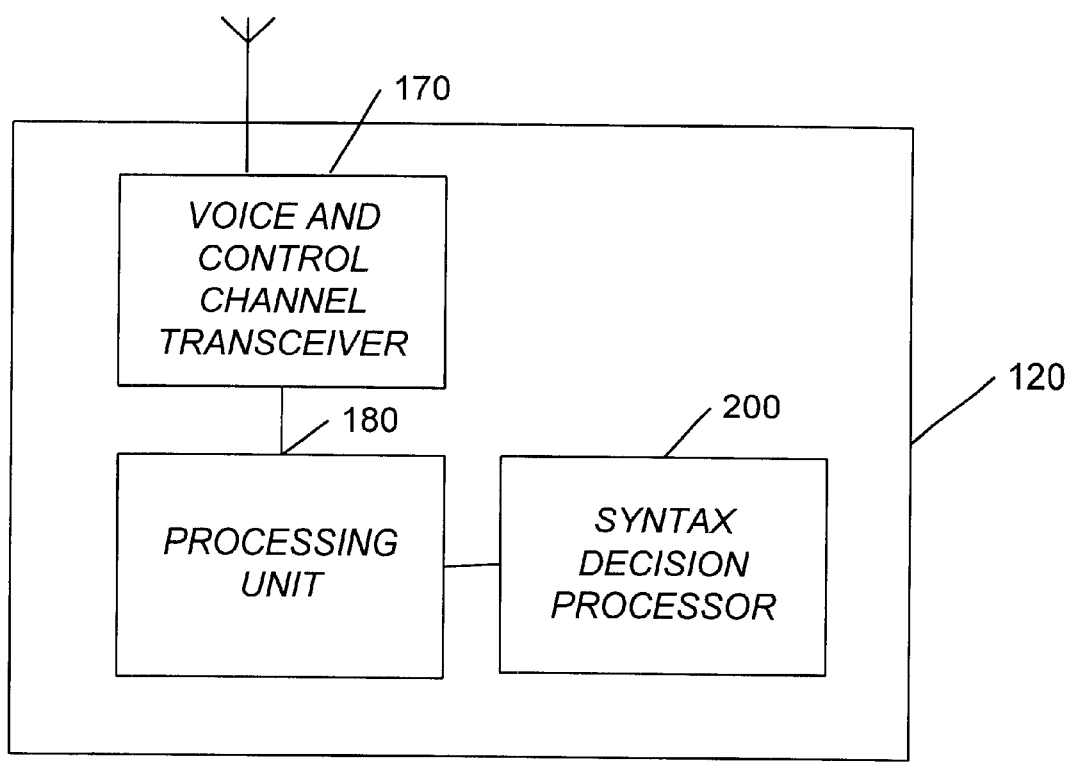
FIG. 5 is a function block diagram illustrating an exemplary mobile radiocommunication terminal according to the present invention.

Nevertheless, in one embodiment illustrated in FIG. 5, mobile unit 120 includes a syntax decision processor 200 for determining whether a received codeword represents an alphabetic or a numeric character. Syntax decision processor may be implemented in software as part of the processing unit 180 or may be a separate processor or application specific integrated circuit (ASIC) included within mobile unit 120. In one embodiment, syntax decision processor 200 analyzes each set of codewords separated by spaces (such set of characters referred to herein as a "word") and checks to see if any of the characters is one of the dual-code characters (i.e. x2, x7, x9, xF or x13). If one or more of the codewords is a dual-code codword, it is assumed to be of the type (i.e. alphabetic or numerical) of the other characters in the word (assuming that they are all of the same type). In another embodiment, when syntax decision processor 200 encounters a word with one or more dual-code codewords, syntax decision processor 200 may hypothesize that the dual-code codewords in the word are alphabetic if a majority of the other characters in the word are alphabetic. Syntax decision processor 200 then compares the hypothesized alphabetic word with a set of stored words in a dictionary to see if the hypothesized word is a valid word. If so, the processor 200 assumes that the hypothesis was correct and displays the word with all dual-code codewords interpreted as alphabetic.

If the entire word is composed of dual-code codewords or if syntax decision processor 200 is otherwise unable to make a determination as to how a dual-code codewords should be displayed, syntax decision processor 200 may display the characters as numbers to avoid confusion or as generic seven-segment digits, thus leaving interpretation to the user.

Other implementations of the syntax decision processing algorithm are possible and may be implemented by a person of skill having knowledge of this invention. For example, the processor could analyze each word for syntactical and grammatical position within a group of words to determine if a particular character in the word is most likely an alphabetic character or a numeric character.

Using the compact character set described in Table 1, assuming each bit is repeated 31 times (for a bit repetition gain of 15 dB), the transmission delay factor for a 64 character message is 64 chars×5 bits/char×31 repetitions× 18.64 ms/slot×1/114 slots/bit=1.62 seconds, or ⅝ of the transmission time required for a message encoded with an 8-bit code.

Alternately, a delay factor of 2.6 seconds for a 64 character message corresponds to a repetition rate of 49.69, or approximately 50, which produces to a bit repetition gain of 10 log(50)=17 dB. Thus, for the same delay required using the 8-bit code, the transmit power must be increased only an additional 13 dB to achieve a total link margin of 30 dB.

For a bit repetition gain of 30 (corresponding to 1000 repetitions per bit), the transmission delay factor is reduced to 52.31 seconds, an improvement of over 31 seconds. This delay may be acceptable if it is impossible or impractical to increase the transmitted signal power.

Figure 4:
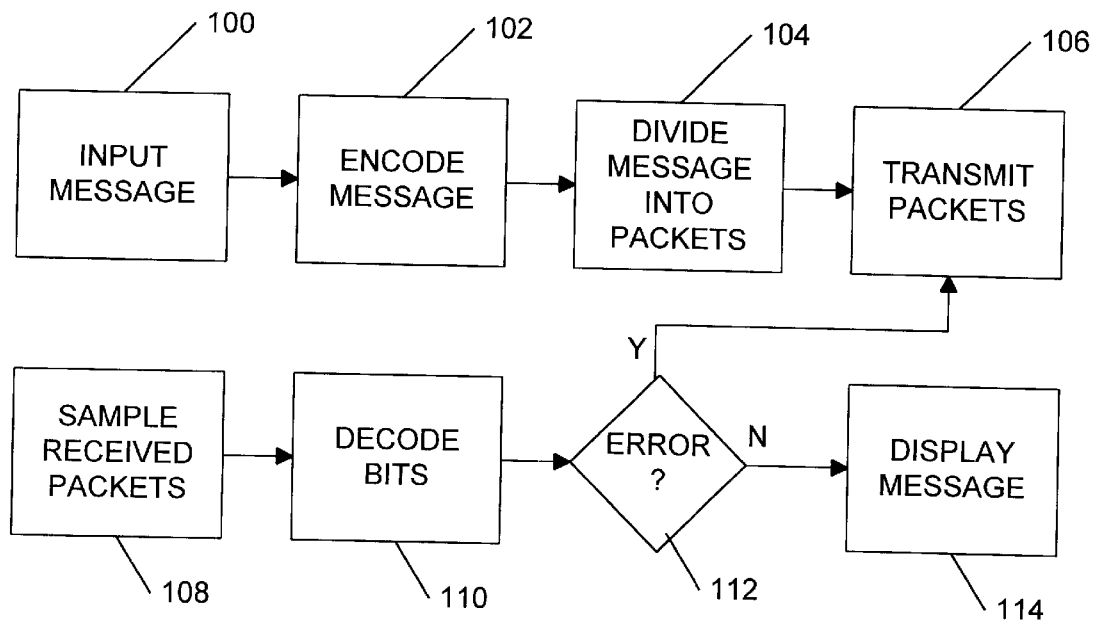
FIG. 4 is a flow chart describing the transmission of a short message according to the present invention.

To implement the technique of the present invention, the power increase from the satellite to the mobile station may be provided by averaging a power load across multiple users. That is, communication channels used by mobile units in near-ideal conditions might have their power reduced to increase the power supply to a mobile unit or units in the non-ideal conditions. Power increase may also be provided by time averaging, in which individual slots in consecutive TDMA frames are transmitted at an increased power level. It will be appreciated that the power increase from the satellite to the mobile station may also be achieved by other techniques known in the art. The power limitations of the mobile unit are even more severe than the power limitations of the satellite. Thus, it is even more difficult to increase power for communication from the mobile to the satellite. Such communication is necessary to send a message or acknowledge receipt of a message. According to one embodiment of the present invention, the power increase from the mobile unit to the satellite may be achieved by allowing the mobile unit to transmit on all time slots of the random access channel RACH. Bit repetition may also be implemented by the mobile unit to further effectively increase the margin of the signal transmitted to the satellite. Since acknowledgement by the mobile unit over the RACH channel may be accomplished by a signal having a low information rate, a higher number of sync bits and a higher number of bit and message repetitions relative to the forward channel can be used to compensate for the lower transmission power of the mobile unit. Preferably, the mobile unit transmits consecutive repetitions on separate carrier frequencies to decorrelate the repetitions. Because the message is short, the transmission time will be short and the average transmitted power will be acceptable using this system. Referring now to FIG. 4, a flow chart describing the transmission of a short message using the transmission method of the present invention is shown. In step 100, a sending party inputs a message to be transmitted to a receiving subscriber. The message may be input into the communication system directly by the sending party through a mobile unit, a standard telephone, a computer terminal, or equivalent device, or the message may be input indirectly by calling an operator at a service center who inputs the message into the system. In step 102, the information bits comprising the short message are encoded by an encoder located at the transmitter using the compact character set described above. The encoder may further encode the message with an error detection code, such as CRC or with an error correcting code. The encoded message constitutes a codeword of some number X of codeword bits or symbols. It should be recognized that the transmitter may be the satellite, a base station, or a mobile unit. In step 104, each of the X codeword bits or symbols output by the encoding means are repeated N times to form a packet containing N bits. It will be apparent that, instead of repeating individual bits or symbols, groups of two or more bits or symbols could also be repeated. Packets are then transmitted such that each slot within a TDMA frame includes one or more packets of repeated bits, error detection coding bits, and a sync burst to enable the receiver to estimate the channel quality. All bits comprising the encoded short message are transmitted in this fashion. Once the entire encoded message has been transmitted, the transmission of the message (in the form of packets of N codeword bits) is repeated M times to achieve the desired signal margin. It will be appreciated that, since the short message may be transmitted from a satellite, base station, or mobile station, encoding and transmitting functions are provided in each of these devices. It will also be appreciated that, in order to implement the technique of the present invention, means are included in the transmitter to determine the number of bit repetitions N, message repetitions M, and power increase necessary to achieve the signal margin required for successful transmission of the message.

In step 108, the receiving device (i.e., the mobile unit, satellite, base station, or equivalent device) samples the received signal, including the repeated encoded message bits, error detection bits, and channel quality estimation bits, and generates a metric sum. In step 110, a decoder contained in the receiving device decodes each encoded bit or symbol in the TDMA slot from the metric sums, using soft combining or majority logic voting, or other suitable decoding methods. To implement soft combining, the decoder adds metric sums and makes a bit or symbol decision based on the sum. To implement majority logic voting, the decoder makes a preliminary bit or symbol decision for each metric and then makes a final bit or symbol decision by comparing all of the preliminary decisions. Thus, if the decoder has made M preliminary decisions, the decoder will determine that the corresponding information bit is a 1 if more than half of the preliminary decisions were 1; otherwise, the decoder will determine that the corresponding information bit is a 0. The same logic is used to decode a bit that is a 0. To prevent an error which might result if exactly half of the preliminary decisions are 0 and exactly half of the preliminary decisions are 1, M is chosen to be an odd number. The decoded bits are combined coherently and the multiple transmissions of the message are combined coherently to generate a message signal having an increased margin.

In step 112, an error detector contained in the receiving apparatus detects errors based on the CRC error detection coding provided at the transmitting apparatus. If no errors are detected, the message is displayed on the receiving subscriber's mobile unit in step 114. If an error is detected, then the message is not displayed at the receiving apparatus, the user is notified of an erroneous message by a displayed error message or by an audio signal, and the receiver requests the transmitter to retransmit message or the erroneous parts of the message in accordance with a bidirectional radio protocol described in more detail below.

According to the present invention, repeated transmission of messages may be used in combination with repetition of individual portions of a message. That is, individual portions of the message may be transmitted multiple times, and when the entire message has been transmitted by means of the repeated transmissions of the message portions, the entire message may be transmitted again.

According to a further aspect of the present invention, the message repetitions are decorrelated by, for example, transmitting the message or message portions on different frequencies, on different polarizations, or at appropriate time delays.

The transmission system of the present invention may further include forward error correction (FEC) means. In such an arrangement, the transmitter is provided with a second encoder for encoding the information bits of the short message with an error correction code, after encoding the information bits with an error detection code in step 102. The message is transmitted, and the received message decoded, in the manner indicated above. With majority logic voting, a hard decision decoder is employed, and the bits at the output of the majority logic voter are fed to a channel decoder with no additional information (such as bit reliability information estimated from the channel). If soft combining is used, a soft decision decoder is employed to decode the error correction code, and metric sums are added to the soft decision decoder output, and the sum is fed to an error correction decoder. Error correction coding will be more effective if different outputs of the error correction encoder are interleaved by separating consecutive output bits as far as possible in the transmission stream.

As described above, the link established for communicating messages between a satellite and a mobile station is a bidirectional link. Accordingly, a radio protocol may be chosen for use between the satellite and the mobile station to enhance the utility of the short message system. For example, a simple protocol may be implemented in which a mobile station receiving a message would respond to the satellite with a "YES" or "NO" to indicate whether the message was received correctly. Alternatively, a more complicated protocol can be implemented in which a packet or group of packets is identified by a group ID and protected by CRC error detection code. If the CRC indicates that the message was not received correctly, then the satellite can re-send the packets comprising the erroneous group. In this manner, only packets with errors need to be retransmitted, as opposed to re-sending a complete message. Thus, this protocol can be used to optimize the number of repeats and thereby minimize delay and wasted satellite power.

Using the technique of the present invention, increased signal margin may be provided without bandwidth expansion, thereby avoiding complicated mobile station design. Further, there is no change required in the TDMA frame structure or organization, other than message content. The method of the present invention allows signals to be transmitted to or from the mobile station. Since the method is bidirectional, it will be appreciated by those of ordinary skill in the art that the system can be implemented as part of a signal control channel in a TDMA system.

While the foregoing description has included many specifics, the exemplary embodiments disclosed are for illustrative purposes only, and are not limiting of the present invention. Many modifications will be readily apparent to those of ordinary skill in the art which do not depart from the spirit and scope of the invention, as defined by the appended claims and their legal equivalents.

What is claimed is:

1. A method for communicating an alphanumeric message, comprising:
   establishing a communication link between a transmitter and a receiver;
   encoding the alphanumeric message to form an encoded message using a character set having corresponding codewords and entries, wherein at least one of the codewords corresponds to both an alphabetic and a numeric entry;
   transmitting an information signal corresponding to the encoded message in groups of one or more information bits from the transmitter to the receiver over the communication link a plurality of times; and
   integrating the transmission of each group to form a received signal having an increased margin level.

2. The method of claim 1, further comprising:
   during said transmitting step, temporarily increasing the transmit signal level of the transmitter.

3. The method of claim 1, further comprising:
   encoding said alphanumeric message using an error detecting code at the transmitter.

4. The method of claim 1, further comprising:
   encoding said alphanumeric message using a forward error correcting code at the transmitter.

5. The method of claim 1, further comprising:
   determining whether the transmission of the information signal is successful, and storing the information bits of the information signal for later transmission to the receiver if the transmission of the information signal is unsuccessful.

6. The method of claim 1, further comprising:
   displaying the received information signal at the receiver.

7. The method of claim 1, further comprising:
   analyzing said integrated information signal at said receiver to determine if one or more of the received codewords corresponds to both an alphabetic and a numeric entry in the character set.

8. The method of claim 7, further comprising:
   evaluating whether said one of said received codewords corresponding to an alphabetic and a numeric entry represents an alphabetic or a numeric character.

9. The method of claim 8, further comprising:
   in said evaluating step, hypothesizing that said one of said received codewords corresponding to an alphabetic and a numeric entry represents an alphabetic character if one or more other of said received codewords in a group of related codewords represents an alphabetic character.

10. The method of claim 9, further comprising:
    comparing said group of related codewords including said hypothesized codeword with a dictionary of possible groups of codewords to determine whether said hypothesis was correct.

11. A communication system, comprising
    an encoder for encoding an alphanumeric message to form an encoded message using a character set having corresponding codewords and entries, wherein at least one of the codewords corresponds to both an alphabetic and a numeric entry;
    a transmitter for transmitting an information signal corresponding to the encoded message in groups of one or more information bits from the transmitter to the receiver over the communication link a plurality of times; and
    a receiver for integrating the transmission of each group to form a received signal having an increased margin level.

12. The system of claim 11, further comprising:
    means for temporarily increasing the transmit signal level of the transmitter.

13. The system of claim 11, further comprising:
    means for encoding said alphanumeric message using an error detecting code at the transmitter.

14. The system of claim 11, further comprising:
    means for encoding said alphanumeric message using a forward error correcting code at the transmitter.

15. The system of claim 11, further comprising:
    means for determining whether the transmission of the information signal is successful, and storing the information bits of the information signal for later transmission to the receiver if the transmission of the information signal is unsuccessful.

16. The system of claim 11, further comprising:
    a display coupled to said receiver for displaying the received information signal at the receiver.

17. The system of claim 11, further comprising:
    a syntax decision processor coupled to said receiver for analyzing said integrated information signal at said receiver to determine if one or more of the received codewords corresponds to both an alphabetic and a numeric entry in the character set.

18. The system of claim 17, wherein said syntax decision processor evaluates whether said one of said received codewords corresponding to an alphabetic and a numeric entry represents an alphabetic or a numeric character.

19. The system of claim 18, wherein said syntax decision processor hypothesizes that said one of said received codewords corresponding to an alphabetic and a numeric entry represents an alphabetic character if one or more other of said received codewords in a group of related codewords represents an alphabetic character.

20. The system of claim 19, wherein said syntax decision processor compares said group of related codewords including said hypothesized codeword with a dictionary of possible groups of codewords to determine whether said hypothesis was correct.

21. A communication device for receiving an encoded alphanumeric message over a communication link, comprising:

a receiver for receiving an information signal corresponding to the encoded message in groups of one or more information bits over the communication link a plurality of times and integrating the transmission of each group to form a received signal having an increased margin level;

a stored table containing a character set having corresponding codewords and entries, wherein at least one of the codewords corresponds to both an alphabetic and a numeric entry; and a syntax decision processor coupled to said receiver for analyzing said integrated information signal at said receiver to determine if a received codewords corresponding to both an alphabetic and a numeric entry in the character set.

22. The communication device of claim 21, further comprising:

means for determining whether said received codeword corresponding to both an alphabetic and a numeric entry in the character set represents an alphabetic character or a numeric character.

23. A method for communicating an alphanumeric message, comprising:

establishing a communication link between a transmitter and a receiver;

encoding the alphanumeric message to form an encoded message using a character set having corresponding codewords and entries, wherein at least one of the codewords corresponds to two alphanumeric entries;

transmitting an information signal corresponding to the encoded message in groups of one or more information bits from the transmitter to the receiver over the communication link a plurality of times; and integrating the transmission of each group to form a received signal having an increased margin level.

24. The method of claim 23 wherein said at least one of the codewords corresponds to two alphanumeric entries comprises said at least one of the codewords corresponding to both an alphabetic entry and a numeric entry.

* * * * *